(12) United States Patent
Luo et al.

(10) Patent No.: US 12,260,256 B2
(45) Date of Patent: Mar. 25, 2025

(54) HYBRID RESOURCE SCHEDULING METHOD AND SYSTEM FOR ONLINE AND OFFLINE TRANSACTIONS

(71) Applicant: Douyin Vision Co., Ltd., Beijing (CN)

(72) Inventors: Mingmeng Luo, Beijing (CN); Wei Shao, Beijing (CN); Yunyao Zhang, Beijing (CN); Zidong Zhao, Beijing (CN); Mengyu Zhang, Los Angeles, CA (US); Shuguang Wang, Beijing (CN); Zongqiang Zhang, Beijing (CN); Wu Xiang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/637,364

(22) Filed: Apr. 16, 2024

(65) Prior Publication Data
US 2024/0264875 A1   Aug. 8, 2024

Related U.S. Application Data

(63) Continuation of application No. PCT/CN2023/078231, filed on Feb. 24, 2023.

(30) Foreign Application Priority Data

Mar. 14, 2022 (CN) .......................... 202210248584.9

(51) Int. Cl.
*G06F 9/50* (2006.01)
*G06F 9/46* (2006.01)
*G06F 9/48* (2006.01)

(52) U.S. Cl.
CPC ............ *G06F 9/5038* (2013.01); *G06F 9/466* (2013.01); *G06F 9/4881* (2013.01)

(58) Field of Classification Search
CPC ....... G06F 9/5038; G06F 9/466; G06F 9/4881
See application file for complete search history.

(56) References Cited

U.S. PATENT DOCUMENTS

| 2017/0005883 A1 | 1/2017 | Towle |
| 2019/0303197 A1 | 10/2019 | Li et al. |
| 2022/0114191 A1* | 4/2022 | Peterson ............. G06F 16/2372 |

FOREIGN PATENT DOCUMENTS

| CN | 102317901 A | 1/2012 |
| CN | 107968810 A | 4/2018 |

(Continued)

OTHER PUBLICATIONS

International Search Report in PCT/CN2023/078231, mailed May 15, 2023, 3 pages.

(Continued)

*Primary Examiner* — Wissam Rashid
(74) *Attorney, Agent, or Firm* — Astute IP Law Group (57) ABSTRACT

The application provides a solution for resource scheduling. A method comprises: monitoring the status of online nodes in an online node cluster; in response to the status of the online nodes meeting a hybrid-deployment triggering condition, determining a lending node from the online node cluster; sending a first instruction to the online transaction controller to indicate the online transaction controller to schedule a current online transaction on the lending node to other online node than the lending node in the online node cluster for processing; and in response to the current online transaction on the lending node being scheduled to the other online node, changing a first status tag value of the lending node to a second status tag value, the second status tag value indicating that the lending node is to be scheduled by an offline transaction controller to process offline transactions.

20 Claims, 6 Drawing Sheets

(56) References Cited

FOREIGN PATENT DOCUMENTS

| | | |
|---|---|---|
| CN | 109412874 A | 3/2019 |
| CN | 112199194 A | 1/2021 |
| CN | 112269641 A | 1/2021 |
| CN | 113176941 A | 7/2021 |
| CN | 113590317 A | 11/2021 |
| CN | 113626162 A | 11/2021 |
| CN | 113672382 A | 11/2021 |
| CN | 114035941 A | 2/2022 |
| CN | 114629960 A | 6/2022 |
| CN | 116541142 A | 8/2023 |
| WO | 2020001320 A1 | 1/2020 |

OTHER PUBLICATIONS

Office Action in Chinese Patent Application No. 202210248584.9, mailed Apr. 8, 2023, 11 pages.
SU et, al., "Research on Off-line Load Resource Scheduling Policy Under Mixed Load Scenario", Software Guide, vol. 19, No. 1, Jan. 2020, with English Abstract, 4 pages.
WANG et, al., "State-of-the-art Survey of Scheduling and Resource Management Technology for Colocation Jobs", ISSN 1000-9825, Coden Ruxuew, Journal of Software, 2020, vol. 31, No. 10, 20 pages, with English Abstract.

\* cited by examiner

FIG. 6

HYBRID RESOURCE SCHEDULING METHOD AND SYSTEM FOR ONLINE AND OFFLINE TRANSACTIONS

CROSS-REFERENCE TO RELATED APPLICATIONS

This application is a continuation of International Patent Application No. PCT/CN2023/078231, filed on Feb. 24, 2023, which claims the benefit of Chinese application No. 20/221,0248584.9 entitled "method, apparatus, system, device, medium and program product for resource scheduling" filed on Mar. 14, 2022, both of which are incorporated herein by reference in their entities.

FIELD

The present application relates to the computer technical field, and in particular, to a method, apparatus, system, device, medium and program product for resource scheduling.

BACKGROUND

In traditional cloud computing technology, the online transaction system that manages online transaction and the offline system that manages offline transaction are generally independent of each other, and their resources cannot be used by each other. This might lead to an imbalance of computing resources between online and offline services, reduce the resource utilization of cloud computing technology, and limit the performance development of cloud computing.

SUMMARY

In view of this, it is an objective of the present disclosure to propose a method, apparatus, system, device, medium and program product for resource scheduling, so as to increase the resource utilization of cloud computing technology to a certain extent.

In a first aspect, the present application provides a method of resource scheduling, comprising:
- monitoring a status of online nodes in an online node cluster, the online node cluster comprising a plurality of online nodes and supporting scheduling by an online transaction controller for processing online transactions;
- in response to the status of the online nodes meeting a hybrid-deployment triggering condition in a hybrid-deployment policy, determining a lending node from the online node cluster, the lending node used to be provided to an offline transaction controller for scheduling to process offline transactions; the hybrid-deployment triggering condition being used to indicate a node status condition that triggers hybrid scheduling of online nodes and offline nodes;
- sending a first instruction to the online transaction controller, the first instruction indicating the online transaction controller to schedule a current online transaction on the lending node to another online node than the lending node in the online node cluster for processing; and
- in response to the current online transaction on the lending node being scheduled to the other online node, changing a first status tag value of the lending node to a second status tag value, the first status tag value indicating that the online node is used to be scheduled by the online transaction controller to process online transactions, the second status tag value indicating that the lending node is used to be scheduled by an offline transaction controller to process offline transactions.

In a second aspect, the present application provides a apparatus for resource scheduling, comprising:
- a hybrid-deployment detecting module configured to monitor monitoring a status of online nodes in an online node cluster, the online node cluster comprising a plurality of online nodes and supporting scheduling by an online transaction controller for processing online transactions;
- a node filtering module configured to, in response to the status of the online nodes meeting a hybrid-deployment triggering condition in a hybrid-deployment policy, determine a lending node from the online node cluster, the lending node used to be provided to an offline transaction controller for scheduling to process offline transactions; the hybrid-deployment triggering condition being used to indicate a node status condition that triggers hybrid scheduling of online nodes and offline nodes;
- a communication module configured to send a first instruction to the online transaction controller, the first instruction indicating the online transaction controller to schedule a current online transaction on the lending node to another online node than the lending node in the online node cluster for processing; and
- a status changing module configured to, in response to the current online transaction on the lending node being scheduled to the other online node, change a first status tag value of the lending node to a second status tag value, the first status tag value indicating that the online node is used to be scheduled by the online transaction controller to process online transactions, the second status tag value indicating that the lending node is used to be scheduled by an offline transaction controller to process offline transactions.

In a third aspect, the present application provides a system for resource scheduling, comprising:
- online nodes configured to process online transactions; the online node comprising an online node agent and an offline node agent, wherein the offline node agent is deployed in the online node based on a copy of the online node and communicates with the online node agent to obtain resource information of the online node.
- offline nodes configured to process offline transactions; and
- the apparatus for resource scheduling according to claim 7, configured to perform resource scheduling on the online node, so that at least a portion of the online nodes are used to process offline transactions.

In a fourth aspect, the present application provides an electronic device, comprising one or more processors, a memory and one or more programs, wherein the one or more programs are stored in the memory and executed by the one or more programs, the program comprising instructions for performing the method according to the first aspect.

In a fifth aspect, the present application provides a non-volatile computer-readable storage medium, containing a computer program which, when executed by one or more processors, causes the processor to perform the method according to the first aspect.

In a sixth aspect, the present application provides a computer program product, comprising computer program instructions which, when running on a computer, cause the computer to perform the method according to the first aspect.

BRIEF DESCRIPTION OF THE DRAWINGS

In order to explain the technical solutions in the present application or related art more clearly, the drawings to be used in the description of embodiments or related art will be briefly introduced below. Obviously, the drawings in the following description are only the embodiments of the present application. For those of ordinary skill in the art, they may further obtain other drawings based on these drawings without the exercise of any inventive skill.

DETAILED DESCRIPTION

In order to make the objective, technical solutions and advantages of the present disclosure more clear, the present disclosure will be further described in detail below with reference to the accompanying drawings in conjunction with specific embodiments.

Note, unless otherwise defined, the technical terms or scientific terminology used in the embodiments of the present disclosure should have ordinary meanings understood by those of ordinary skill in the field to which the present disclosure belongs. "First", "second" and similar words used in the embodiments of the present disclosure do not indicate any order, quantity or importance, but are only used to distinguish different components. Words such as "comprise" or "include" mean that the element or article preceding the word include the elements or articles listed after the word and their equivalents, without excluding other elements or objects. Words such as "connect" or "connected" are not limited to physical or mechanical connections, but may include electrical connections, whether direct or indirect. "Up", "down", "left", "right" and the like are only used to indicate relative positional relationships, and when the absolute position of the object described changes, the relative positional relationship may also change accordingly.

There is a significant tidal phenomenon in online transaction in cloud computing technology. During periods of low transaction traffic, resources will be left idle, which leads to waste. At the same time, for offline transaction, task queuing takes a long time due to insufficient resources, which makes the resource utilization of cloud computing technology inefficient. Therefore, achieving hybrid deployment of online services and offline services is particularly important to improve resource utilization in cloud computing scenarios. Although some studies have provided theoretical methods for hybrid deployment of online services and offline services, these methods are usually hybrid deployment methods based on a single management system such as virtual machines. However, since commonly used online transaction management systems (such as kubernetes systems, referred to as K8s systems) and offline management systems (such as yarn systems) are independent of each other, existing single management system methods based on virtual machines can hardly be applied to such cloud computing scenarios for multi-management systems. Then, how to achieve hybrid scheduling of resources between online services managed by K8s and offline services managed by yarn has become an urgent technical issue that needs to be solved.

In view of this, the embodiments of the present disclosure provide a solution to the above problems. The present application provides a source scheduling solution by lending online nodes to offline services when their resources are idle, integrating the computing resources of the originally independent online management system and offline management system. Hence, the idle resources of the online management system can be provided for the use of offline services of the offline management system. Meanwhile, the solution ensures the mutual isolation between the online transaction of the online management system and the offline transaction of the offline management system to avoid mutual influence, thereby improving the resource utilization of the online management system and offline management system.

Figure 1:
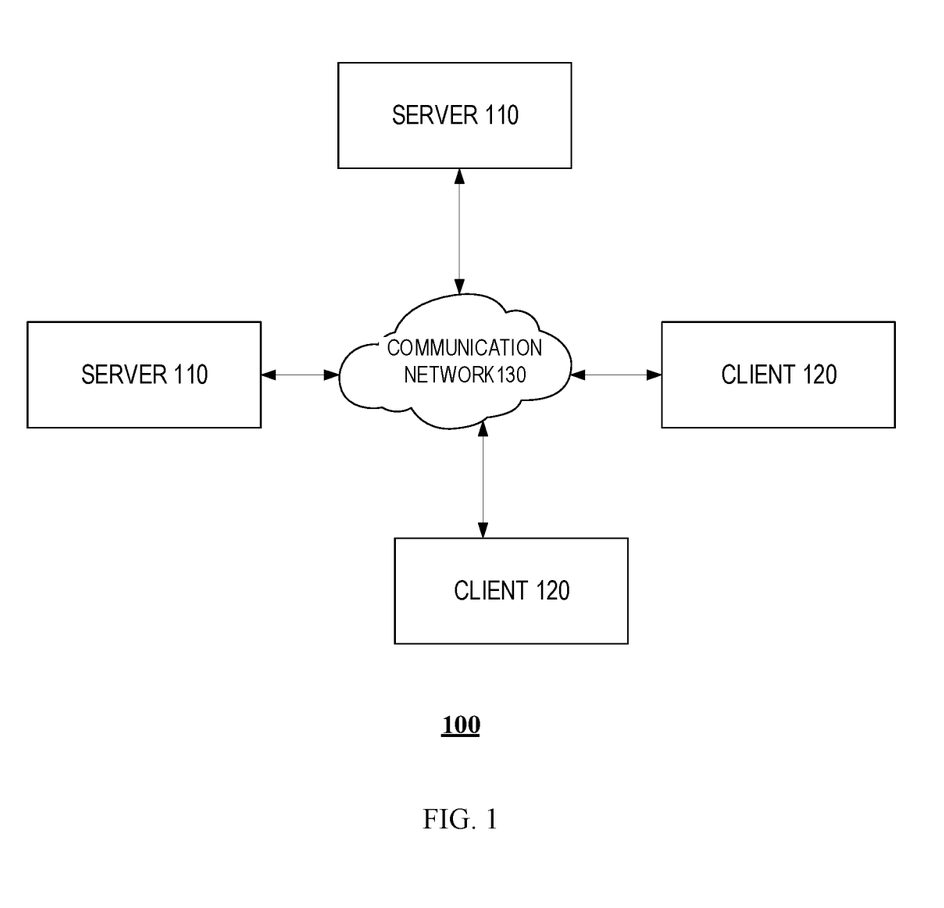
FIG. 1 is a schematic diagram of the resource scheduling architecture of a model in the embodiments of the present disclosure.

FIG. 1 shows a schematic diagram of the resource scheduling architecture of a model of the embodiments of the present disclosure. With reference to FIG. 1, the resource scheduling architecture 100 of this model may include a server 110, a terminal 120, and a network 130 that provides a communication link. The server 110 and the terminal 120 may be connected through a wired or wireless network 130. The server 110 may be an independent physical server, a server cluster or a distributed system composed of a plurality of physical servers, or may further be a cloud server that provides basic cloud computing services such as cloud services, cloud databases, cloud computing, cloud functions, cloud storage, network services, cloud communications, middleware services, domain name services, security services, CDN, and big data and artificial intelligence platforms.

The terminal 120 may be implemented as hardware or software. For example, when the terminal 120 is implemented as hardware, it can be various electronic devices that have a display screen and support page display, including but not limited to smart phones, tablet computers, e-book readers, laptop computers, desktop computers, and so on. When the terminal 120 device is implemented as software, it can be installed in the electronic device listed above; it can be implemented as a plurality of software or software modules (such as software or software modules used to provide distributed services), or it can be implemented as a single software or software module, which is not specifically limited here.

It should be noted that the method for resource scheduling provided by the embodiments of the present application can be performed by the server 110. The client 120 submits offline transaction and/or online transaction to the server 110, and the server 110 returns a response result to the client after processing the offline transaction and/or online transaction. It should be understood that the number of terminals, networks and servers in FIG. 1 is only for illustration and is not intended to be limiting. There may be any number of terminals, networks, and servers depending on implementation needs.

Figure 2A:
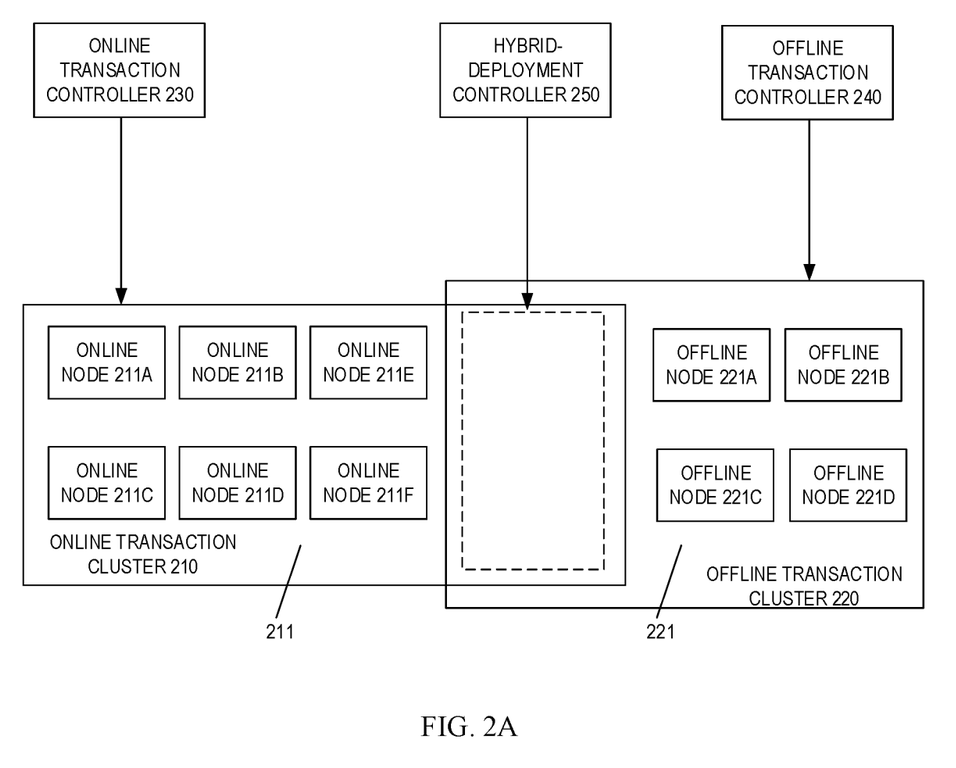
FIGS. 2A-2B are schematic principle diagrams of a method for resource scheduling in the embodiments of the present disclosure.
Figure 2B:
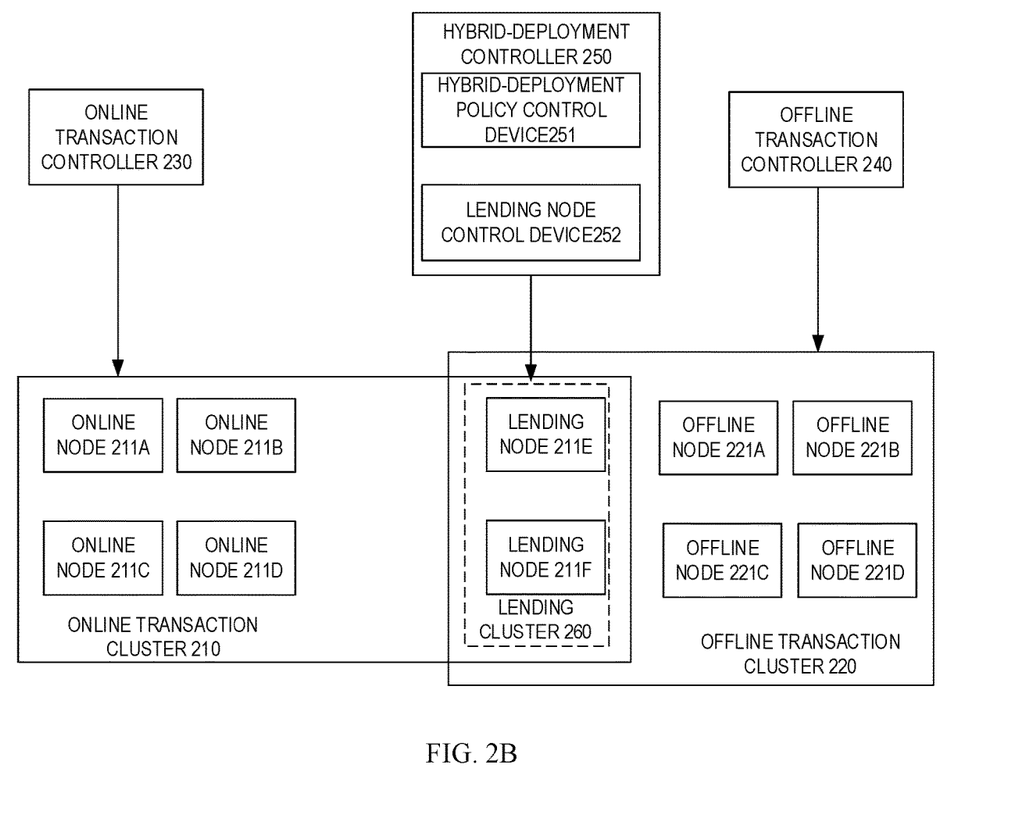

With reference to FIGS. 2A-2B, each shows a schematic principle diagram of a method for resource scheduling according to the embodiments of the present disclosure.

In FIG. 2A, an online transaction cluster 210 in the online transaction management system (such as the K8s system) may include at least one online node 211, such as online nodes 211a, 211b, 211c, 211d, 211e, and 211f. The online node 211 is used to process online transaction submitted by a client (e.g., the client 120 in FIG. 1). Each online node 211 has a status tag with a status tag value "online" to indicate that the node can be used by online transaction. Online transaction can only be allocated to the online node 211 with a status tag value "online" for processing.

An offline transaction cluster 220 in the offline transaction management system (such as the yarn system) may include at least one offline node 221, such as offline nodes 221a, 221b, 221c, and 221d in FIG. 2A. The offline node 221 is used to process offline transaction submitted by a client (e.g., the client 120 in FIG. 1). Each offline node 221 has a status tag with a status tag value "offline" to indicate that the node can be used by offline transaction. Offline transaction can only be allocated to the offline node 221 with a status tag value "offline" for processing.

In this way, by determining whether the transaction type that can be scheduled to each node is online transaction or offline transaction based on the status tag value of each node, it is possible to prevent online transaction or offline transaction from being scheduled to the same node and further avoid resource contention.

In some embodiments, an online node agent (such as K8s kubelet) and an offline node agent (such as yarn node manager) can be deployed on the online node 211 at the same time. In some embodiments, the offline node agent can be deployed in the online node based on a copy of the online node to communicate with the online node agent to obtain the resource information of the current online node (for example, the amount of used resources, the amount of unused resources, the resource utilization rate, the total amount of resources, etc.). For example, the offline node agent yarn node manager in the online node 211 can be deployed in the online management system K8s using a copy of the K8s daemonset, and communicate with the online node agent K8s kubelet to obtain the resource information of the current node.

In FIG. 2A, an online service controller 230 may allocate the online transaction submitted by the client to the online node 211 for processing. As an obvious tidal phenomenon, the number of online transactions has certain regularity, that is, the number of online transactions changes periodically. When the online transaction is in the trough stage, such as time period T1, resources of the online node 211 become idle.

An offline service controller 240 may allocate the offline transaction submitted by the client to the offline node 221 for processing. Since offline services often have long queuing times due to insufficient resources, they are usually not processed in a timely manner. For example, in FIG. 2A, each offline node 221 is allocated with offline transaction in the time period T1, and there are more offline services queued for processing. It can be seen that, also in the time period T1, resources of the online node 211 are idle, while there are still many offline transactions in the queue at the offline node 221.

At this time, a hybrid-deployment controller 250 can lend part of the resources in the online node 211 to the offline transaction for processing, so that the overall computing resources of the online transaction and the offline transaction can be reasonably allocated and scheduled. The lending may refer to providing resources of the online node 211 to the offline transaction for use. Therefore, in some embodiments, based on the change cycle of the number of online transactions, when a predetermined time period is reached (for example, the number of online transactions is in a trough period), the idle resources in the online node 211 can be lent to offline transactions. In some embodiments, based on the resource utilization rate of the online transaction cluster, when the resource utilization rate of the online node is in a predetermined range (for example, below a threshold), the idle resources in the online node 211 can be lent to the offline transaction for use. In some embodiments, when idle resources in the online node 211 are lent to offline transaction, the online transaction controller 230 can control the to-be-lent online transaction on the online node to be scheduled to other non-lending online nodes for processing.

In FIG. 2A, the hybrid-deployment controller 250 includes a hybrid-deployment policy control device 251 and a lending node control device 252. The user can configure the hybrid scheduling policy between the online node and the offline node through the hybrid-deployment policy control device 251. The lending node control device 252 schedules lending nodes in the online node 211 based on the configured hybrid scheduling policy.

In some embodiments, the hybrid scheduling policy may include: source information of the online node 211 and target information of the offline node 221. Furthermore, the hybrid scheduling policy may also include: a predetermined time period of hybrid scheduling and/or a predetermined number of lending nodes.

In some embodiments, the source information of the online node 211 may include at least one of: the number of the online nodes 211, the total resource amount of each online node 211, and the identification or ID of each online node 211.

In some embodiments, the target information of the offline node 221 may include at least one of: the number of the offline nodes 221, the total resource amount of each offline node 221, and the identification or ID of each offline node 221.

In some embodiments, the predetermined time period of hybrid scheduling may refer to the time when hybrid scheduling can be performed, e.g., the trough stage of the number of online transactions. Further, in some embodiments, the predetermined time period may include a plurality of trough stages. Since the number of online transactions changes periodically, the predetermined time period can be set in advance.

In some embodiments, the predetermined number of lending nodes may refer to the number of online nodes to be lent. For example, the predetermined number of lending nodes may be m. Then, when the hybrid-deployment controller 250 lends online nodes, it lends m online nodes from the online transaction cluster 210 for offline transaction use.

Further, in some embodiments, when the hybrid scheduling policy includes the predetermined time period of hybrid scheduling and the number of predetermined lending nodes, each predetermined time period can have a corresponding number of predetermined lending nodes to represent the number of online nodes that can be scheduled in the predetermined time period. For example, the hybrid scheduling policy is configured with a plurality of predetermined time periods T1, T2, . . . , among which the number of predetermined lending nodes corresponding to the predetermined time period T1 is M1 and the number of predetermined lending nodes corresponding to the predetermined time period T2 is M2. In other words, the lending amount for each predetermined time period can be different. The number of online transactions may vary in each lending cycle. Sometimes it is very few (for example, at night), at which point more online nodes can be lent; sometimes it is more than at night but less than the peak period, at which point less online nodes may be lent to provide more flexible hybrid policies.

In FIG. 2A, when the online transaction is in the trough period or the resource utilization rate of the online node is in a predetermined range, the hybrid-deployment controller 250 can determine a lending node from the online nodes 211. For example, a default online node can be set as the lending node, or an online node can be randomly selected as the lending node. Further, the online nodes 211 can be ranked according to a filtering rule in the hybrid scheduling policy to filter out lending nodes.

In some embodiments, the filtering rule includes at least one predetermined rule.

In some embodiments, the predetermined rule may include a first predetermined rule, and the first predetermined rule may further include: judging whether the total resource amount of a first online node is less than that of a second online node; in response to the total resource amount of the first online node being less than that of the second online node, determining that the first online node has priority in lending over the second online node.

In some embodiments, the predetermined rule may further include a second predetermined rule, and the second predetermined rule may further include: judging whether the total resource amount of a third online node is less than that of a fourth online node;

in response to the current transaction number of the third online node being less than the current transaction number of the fourth online node, determining that the third online node has priority in lending over the fourth online node.

In some embodiments, the predetermined rule may further include a third predetermined rule, and the third predetermined rule may further include: judging whether the minimum allowed disruption (Min Allowed Disruption) of a fifth online node is greater than that of a sixth online node; in response to the minimum allowed disruption of the fifth online node being greater than that of the sixth online node, determining that the fifth online node has priority in lending over the sixth online node. The minimum allowed disruption may refer to the minimum value in the "Disruptions Allowed" field in the online transaction of the pdb (Pod Disruption Budget) configured on the online node.

In order to ensure that the processing of the overall online transaction is affected as little as possible and that the lending node is lent faster, an online node with a smaller total resource amount, less transaction on the node, and a larger minimum allowed disruption on the node can be lent in priority, so as to lend available online nodes as quickly as possible.

In some embodiments, when the filtering rule includes more than one of the predetermined rules, there is a priority between the individual rules. It should be understood that the priorities between various predetermined rules can be set in advance, which will not be limited here.

In some embodiments, the filtering out the lending nodes from the online node cluster according to the filtering rules comprises:
    determining the order of any two of the online nodes by selecting the first predetermined rule, the second predetermined rule or the third predetermined rule based on a priority order corresponding to the first predetermined rule, the second predetermined rule or the third predetermined rule;
    obtaining the ranking of all the online nodes based on the order of any two nodes; and
    selecting the top m online nodes in the ranking as the lending nodes, where m is a positive integer.

Specifically, in some embodiments, the filtering out the lending nodes from the online node cluster according to the filtering rules comprises: judging the order of any two of the online nodes based on a first predetermined rule with a first priority among the predetermined rules;
    if the order of any two nodes is not determined based on the first predetermined rule, judging the order of any two nodes based on a second predetermined rule with a second priority among the predetermined rules;
    obtaining the ranking of all the online nodes based on the order of any two nodes; and
    selecting the top m online nodes in the ranking as the lending nodes, where m is the number of predetermined lending nodes and is a positive integer.

In some embodiments, the filtering out the lending nodes from the online node cluster according to the filtering rules further comprises:
    if the order of any two nodes is not determined based on the second predetermined rule, judging the order of any two of the online nodes based on a third predetermined rule with a third priority among the predetermined rules.

In some embodiments, the first priority is higher than the second priority, and the second priority is higher than the third priority. For example, in FIG. 2A, the online node 211a is allocated with 5 online transactions, the online node 211b is allocated with 3 online transactions, the online node 211c is allocated with 4 online transactions, the online node 211d is allocated with 6 online transactions, and the online node 211e is allocated with no transaction, and the online node 211f is allocated with 1 online transaction. For the online node 211a and the online node 211b, the first predetermined rule with the highest priority (for example, the online node with a small total resource amount is lent first) is first used for judgment. If the ranking between the online node 211a and the online node 211b can be determined according to the first predetermined rule 211b, then the ranking between the online node 211a and the online node 211b is determined; if the ranking between the online node 211a and the online node 211b cannot be determined according to the first predetermined rule (for example, when the total resource amount of the online node 211a is equal to that of the online node 211b), the second predetermined rule with the second priority is used to make the judgment, and so on, until the ranking between the online node 211a and the online node 211b is determined. The hybrid-deployment controller 250 ranks the online nodes 211 according to the filtering rules as follows: the online node 211e, the online node 211f, the online node 221b, the online node 221c, the online node 221a, and the online node 221d. The hybrid-deployment controller 250 filters out m online nodes for lending according to the predetermined number of lending nodes m in the hybrid scheduling policy. For example, m=2, then the top two online nodes in the ranking, namely the online node 211e and the online node 211f, are determined as the lending nodes.

The hybrid-deployment controller 250 may send a first instruction to the online transaction controller 230, so that the online transaction controller 230 schedules the current online transaction on the lending node to a non-lending node among the online nodes for processing. After receiving the first instruction, the online transaction controller 230 simulates the scheduling of the current online transactions on all lending nodes to non-lending nodes to ensure that the normal processing of online transactions is not affected while lending resources. For example, if no transactions is allocated to the online node 211e, there is no need to simulate scheduling, and the 1 online transaction S at the online node 211f is scheduled to the other online node 211b. If the simulation is successful, the online transaction S at the online node 211f is scheduled to be the online node 211b. If the simulation is unsuccessful, the flow will continue to simulate-schedule the online transaction S to the online node 211c, the online node 221a, the online node 221d, etc., until all online nodes are traversed or the simulation is successful. If the simulation is still not successful after traversing all online nodes, the actual scheduling operation of the online transaction S will not be performed. After successfully scheduling all current online transactions of all lending nodes, the online transaction controller 230 performs actual scheduling operations on all current online transactions of all lending nodes.

Figure 3:
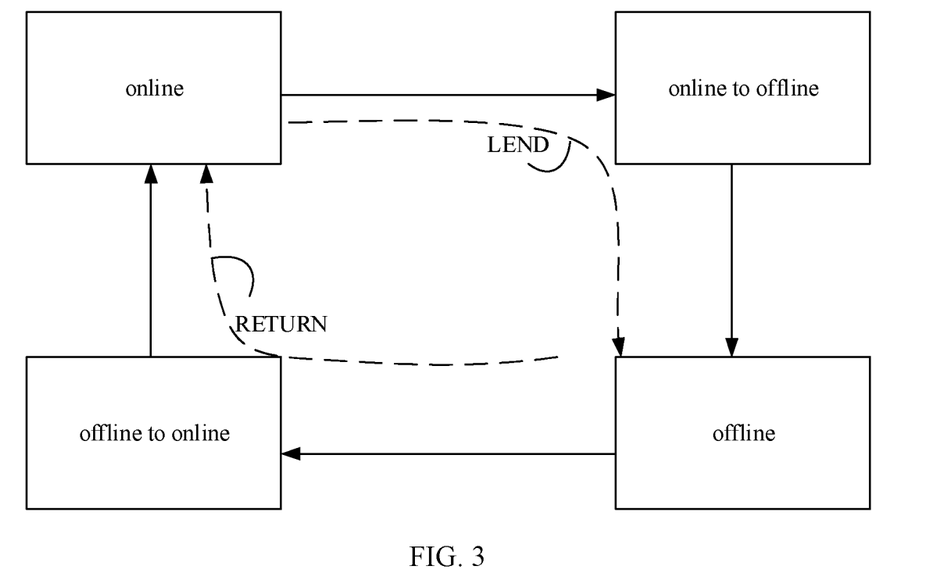
FIG. 3 is a schematic diagram of status label changes of online nodes in the embodiments of the present disclosure.

While the online transaction controller 230 schedules the current online transaction for the lending node, the lending node control device 252 in the hybrid-deployment controller 250 can set the status tag value of the lending node from "online" to "online to offline" to indicate that the node is in the lending process from online to offline. As shown in FIG. 3, this figure shows a schematic diagram of status label changes of online nodes according to the embodiments of the present disclosure. In FIG. 3, before the online transaction controller 230 schedules the current online transaction S for the lending node 211f, the status tag value of the lending node 211f is "online". While the online transaction controller 230 schedules the current online transaction S for the lending node 211f, the hybrid-deployment controller 250 sets the status tag value on the lending node 211f to "online to offline", indicating that the lending node 211f is in removal of the current online transaction and is not invoked by the online transaction controller or offline transaction controller in removal of the current online transaction. After the online transaction controller 230 actually successfully schedules the current online transaction S of the lending node 211f to other online nodes, there is no online transaction on the lending node 211f. At this time, the hybrid-deployment controller 250 sets the status tag value of the lending node 211f from "online to offline" to "offline".

After the hybrid-deployment controller 250 sets the status tag value of the lending nodes 211e and 211f to "offline", the lending nodes 211e and 211f form a lending cluster 260, as shown in FIG. 2B. At this time, the offline task controller 240 may according to the queuing order of the offline transactions, allocate the offline transactions to the lending nodes 211e and 211f with the tag status value "offline" for processing. By integrating the computing resources of the originally independent online management system (such as K8s system) and offline management system (such as yarn system), the idle resources of the online management system can be well provided for the use of offline transactions of the offline management system. Moreover, reasonable lending of online transaction resources can be achieved on the premise of ensuring the SLA (Service-Level Agreement) of the online transaction. Meanwhile, the mutual isolation is ensured between the online transaction of the online management system and the offline transaction of the offline management system to avoid mutual influence. Hence, the resource utilization rate of both the online management system and offline management system is increased, and the resource usage cost under the independent online management system and offline management system in traditional cloud computing scenarios is greatly reduced.

When the number of online transactions increases or the resource utilization rate of the online nodes in the online node cluster exceeds the predetermined range or the current time is not within the predetermined time period, the number of online nodes needs to be increased. The hybrid-deployment controller 250 and the offline transaction controller 240 will return the lending nodes in the lending node cluster 260 to the online node cluster 210 for use by online transactions. The hybrid-deployment controller 250 may send a second instruction to the offline transaction controller 240, so that the offline transaction controller 240 removes the current offline transaction on the lending node. At the same time, as shown in FIG. 3, the hybrid-deployment controller 250 sets the status tag value of the lending node from "offline" to "offline to online" to indicate that the node is in the return process from offline to online. For example, in FIG. 2B, the hybrid-deployment controller 250 may set the status tag value of the lending nodes 211e and 211f to "offline to online (offline to online)". The offline transaction controller 240 controls the offline transactions on the lending node to exit, or schedules them to the offline nodes 221a, 221b, 221c, and 221d in the offline node cluster 220 (for example, when the offline nodes in the offline node cluster 220 can meet the scheduled offline transaction). In some embodiments, after receiving the second instruction, the offline transaction controller 240 may send a service removal instruction to the lending node to remove all current offline tasks of the lending node. In some embodiments, the offline transaction controller 240 can further set a compulsory removal time, so that when the compulsory removal time expires, the offline transaction that has not exited on the lending node will be compulsorily removed directly. When there is no offline transaction on the lending node, the hybrid-deployment controller 250 sets the status tag value of the lending node to "online", as shown in FIG. 3. For example, when there is no offline transaction on the lending nodes 211e and 211f in FIG. 2B, the hybrid-deployment controller 250 sets the status tag value of the lending nodes 211e and 211f from "offline to online" to "online". At this time, the lending nodes 211e and 211f are returned to the online node cluster 210 and become online nodes 211e and 211f, as shown in FIG. 2A. Hence, borrowed resources can be returned quickly, where the return can refer to providing the lending nodes for online transaction use.

Figure 4:
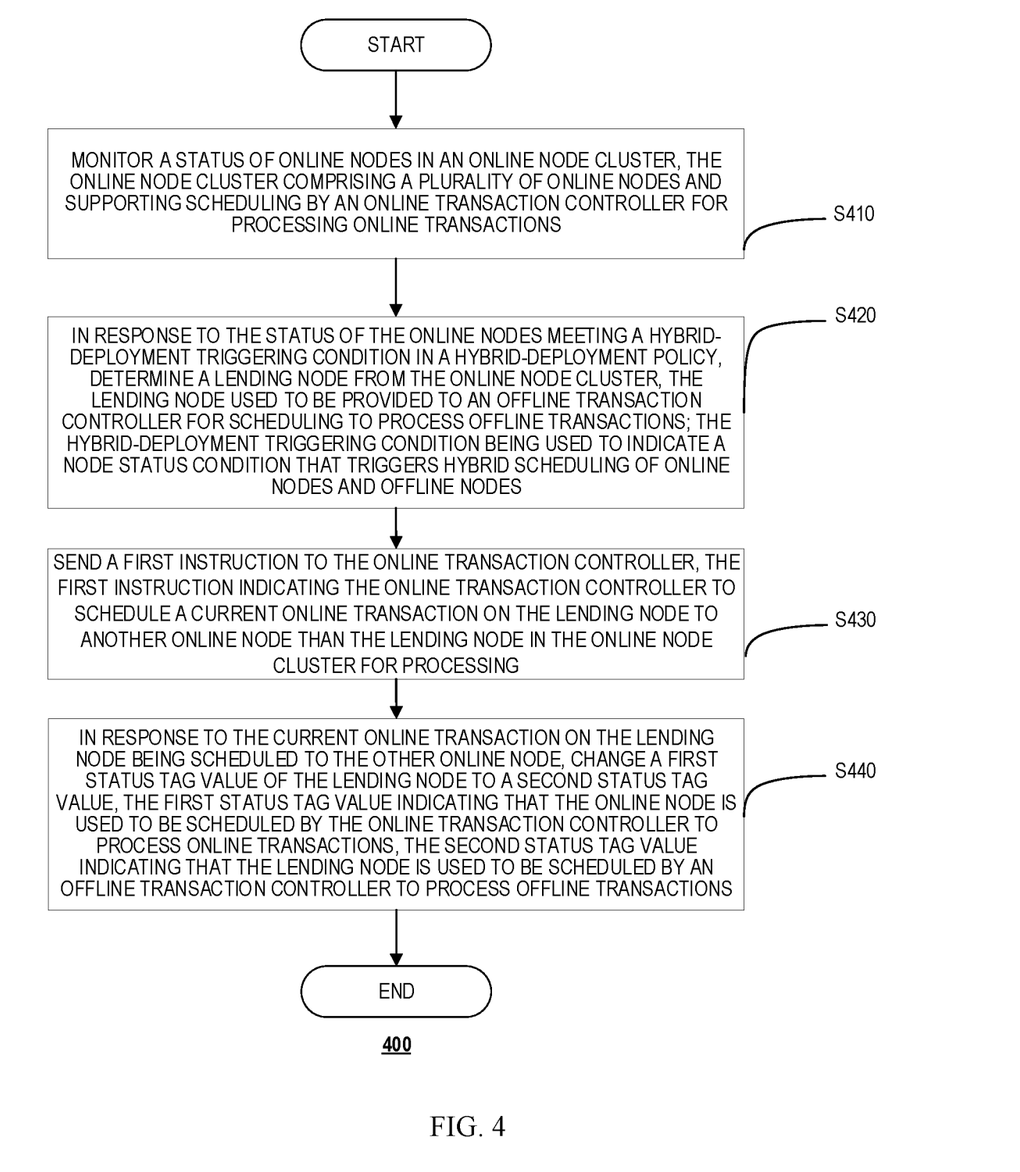
FIG. 4 is a schematic flowchart of a method for resource scheduling method in the embodiments of the present disclosure.

With reference to FIG. 4, this figure shows a schematic flowchart of a method for resource scheduling according to the embodiments of the present disclosure. The method for resource scheduling may be performed by a hybrid-deployment controller (e.g., the hybrid-deployment controller 250 in FIG. 2A). As shown in FIG. 4, a method 400 for resource scheduling comprises:

In step S410, the status of an online node (such as the online node 211 in FIG. 2A) in an online node cluster is monitored, the online node cluster comprising a plurality of online nodes and supporting scheduling by an online service controller (such as the online service controller in FIG. 2A 230) for processing online transactions;

In step S420, in response to the status of the online node meeting the hybrid-deployment triggering condition, a lending node (for example, the online nodes 211*e*, 211*f* in FIG. 2A) is determined from the online node cluster, the lending node being to be provided to an offline transaction controller (for example, the offline transaction controller 240 in FIG. 2B) to process offline transactions; the hybrid-deployment triggering condition is used to indicate a node status condition that triggers the hybrid scheduling of online nodes and offline nodes (for example, at a predetermined time period (such as the predetermined time periods T1, T2, etc., in the aforementioned embodiments) and/or within a predetermined resource utilization rate range);

In step S430, a first instruction is sent to the online transaction controller, the first instruction instructing the online transaction controller to schedule a current online transaction on the lending node (for example, the online nodes 211*e* and 211*f* in FIG. 2A) to other online node (such as the online nodes 211*a*, 211*b*, 211*c* in FIG. 2A) than the lending node in the online node cluster for processing;

In step S440, in response to the current online transaction on the lending node being scheduled to the other online node, a first status tag value of the lending node (for example, "online" in FIG. 3) is changed to a second status tag value (e.g., "offline" in FIG. 3) (e.g., a dashed line "Lending" in FIG. 3), the first status tag value indicating that the online node is to be scheduled by an online transaction controller to process online transactions, the second status tag value indicating that the lending node is to be scheduled by an offline transaction controller to process offline transactions.

In some embodiments, determining the lending node from the online node cluster comprises:
filtering out the lending node from the online node cluster according to filtering rules in the hybrid deployment policy, the filtering rules comprising at least one of a first predetermined rule, a second predetermined rule and a third predetermined rule;
wherein, the first predetermined rule comprises:
judging whether the total resource amount of a first online node is less than that of a second online node;
in response to the total resource amount of the first online node being less than that of the second online node, determining that the first online node has priority in lending over the second online node;
the second predetermined rule comprises:
judging whether the total resource amount of a third online node is less than that of a fourth online node;
in response to the total resource amount of the third online node being less than that of the fourth online node, determining that the third online node has priority in lending over the fourth online node;
the third predetermined rule comprises:
judging whether the minimum allowed disruption of a fifth online node is greater than that of a sixth online node;
in response to the minimum allowed disruption of the fifth online node being greater than that of the sixth online node, determining that the fifth online node has priority in lending over the sixth online node.

In some embodiments, the filtering out the lending node from the online node cluster according to the filtering rules comprises:
determining the order of any two of the online nodes by selecting the first predetermined rule, the second predetermined rule or the third predetermined rule based on a priority order corresponding to the first predetermined rule, the second predetermined rule or the third predetermined rule;
obtaining the ranking of all the online nodes based on the order of any two nodes; and
selecting the top m online nodes in the ranking as the lending nodes, m being a positive integer.

In some embodiments, the method 400 further comprises: when the current online transaction on the lending node is scheduled to other online node than the lending node in the online node cluster for processing, changing a status tag value of the lending node from a first status tag value (for example, "online" in FIG. 3) to a third status tag value (for example, "online to offline" in FIG. 3), the third status tag value indicating that the lending node is in removal of the current online transaction and is not invoked by the online transaction controller or the offline transaction controller.

In some embodiments, the method 400 further comprises: after the current online transaction on the lending node is scheduled to the other online node for processing, changing a status tag value of the lending node from the third status tag value (For example, "online to offline" in FIG. 3) to a second status tag value (for example, "offline" in FIG. 3).

In some embodiments, the method 400 further comprises:
in response to a status of the online node meeting a hybrid-deployment terminating condition in a hybrid scheduling policy, changing the second status label value of the lending node (for example, "offline" in FIG. 3) to the first status tag value (for example, "online" in FIG. 3); wherein, the hybrid-deployment terminating condition is used to indicate a node status condition for terminating the hybrid scheduling of online nodes and offline nodes.

In some embodiments, the hybrid-deployment terminating condition may comprise exceeding the predetermined time period and/or exceeding the predetermined resource utilization rate range.

In some embodies, the changing the second status tag value of the lending node to the first status tag value (for example, the dotted line "return" in FIG. 3) comprises:
sending a second instruction to the offline transaction controller (for example, the offline transaction controller 240 in FIG. 2B), the second instruction instructing the offline transaction controller to remove the current offline transaction on the lending node (for example, the lending nodes 211*e* and 211*f* in FIG. 2B); and
changing the second status tag value of the the lending node to a fourth status tag value (for example, "offline to online" in FIG. 3), the fourth status tag value indicating that the lending node is in removal of the current offline transaction;
in response to the removal of the current offline service being completed, changing the fourth status tag value (for example, "offline to online" in FIG. 3) of the lending node to the first status tag value (for example, "online" in FIG. 3).

It should be noted that the method of the embodiments of the present application can be performed by a single apparatus, such as a computer or server. The method of the embodiments of the present application can also be applied in distributed scenarios and completed by a plurality of apparatuses cooperating with each other. In such a distributed scenario, one of the plurality of apparatuses may only perform one or more of the steps in the method of the embodiments of the present application, and the plurality of apparatuses will interact with each other to complete the method.

It should be noted that some embodiments of the present application have been described above. Other embodiments are within the scope of the appended CLAIMS. In some cases, the actions or steps defined in CLAIMS can be performed in a different order than in the above embodiments and still achieve the desired results. Additionally, the processes depicted in the drawings do not necessarily require the specific order shown or sequential order to achieve desirable results. Multitasking and parallel processing are also possible or may be advantageous in certain implementations.

As can be seen from the above description, by lending an online node for offline transaction use when the resource of the online node is idle, integrates the computing resources of the originally independent online management system and offline management system, so that the idle resources of the online management system can be well provided for the use of offline transactions of the offline management system. Meanwhile, the mutual isolation is further ensured between the online transaction of the online management system and the offline transaction of the offline management system to avoid mutual influence. Thus, the resource utilization rate of the online management system and offline management system is increased, and the resource usage cost under the independent online management system and offline management system in traditional cloud computing scenarios is greatly reduced.

Figure 5:
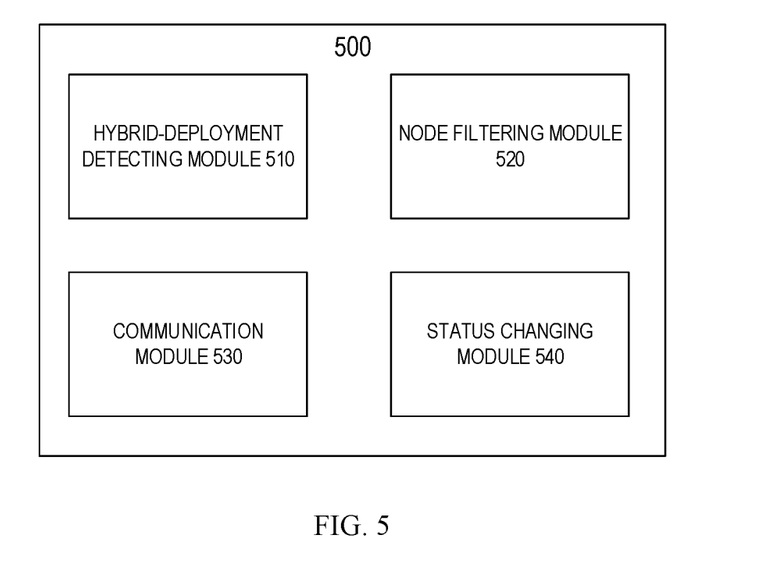
FIG. 5 is a schematic structural diagram of an apparatus for resource scheduling in the embodiments of the present disclosure.

Based on the same concept of, the embodiments of the present application further provide an apparatus for resource scheduling. Referring to FIG. 5, the apparatus 500 for resource scheduling comprises:

a hybrid-deployment detecting module 510 configured for monitoring the status of an online node in an online node cluster, the online node cluster comprising a plurality of online nodes and supporting scheduling by an online service controller for processing online transactions;

a node filtering module 520 configured for, in response to the status of the online node meeting a hybrid-deployment triggering condition in a hybrid-deployment policy, determining a lending node from the online node cluster, the lending node being to be provided to an offline transaction controller to process offline transactions; wherein the hybrid-deployment triggering condition is used to indicate a node status condition that triggers the hybrid scheduling of online nodes and offline nodes;

a communication module 530 configured for sending a first instruction to the online transaction controller, the first instruction instructing the online transaction controller to schedule a current online transaction on the lending node to other online node than the lending node in the online node cluster for processing; and a status changing module 540 configured for, in response to the current online transaction on the lending node being scheduled to the other online node, changing a first status tag value of the lending node to a second status tag value, the first status tag value indicating that the online node is to be scheduled by an online transaction controller to process online transactions, the second status tag value indicating that the lending node is to be scheduled by an offline transaction controller to process offline transactions.

The apparatus for resource scheduling of the above embodiments is used to implement the corresponding method for resource scheduling in any of the above embodiments applied to a terminal, with the beneficial effects of the corresponding method embodiments, which will not be repeated here.

Based on the same concept, the embodiments of the present application further provide a system for resource scheduling system, comprising:

an online node configured for processing online transactions; an online node agent (such as K8s kubelet) and an offline node agent (such as yarn node manager) being deployed on the online node, where the offline node agent is deployed in the online node based on a copy of the online node and communicates with the online node agent to obtain resource information of the online node.

an offline node configured for processing offline transactions; and the apparatus for resource scheduling according to the embodiments of the present disclosure, configured for performing resource scheduling on the online nodes, so that at least part of the online nodes are used to process offline transactions.

In some embodiments, the system for resource scheduling according to the embodiments of the present disclosure further comprises:

an online transaction controller (such as online transaction controller 230 in FIGS. 2A/2B) configured for:

receiving the first instruction from the apparatus for resource scheduling (such as the hybrid-deployment controller 250 in FIGS. 2A/2B);

in response to the first instruction, performing simulated scheduling on a current online transaction on the lending node (such as the online nodes 211e and 211f in FIGS. 2A/2B) to simulate scheduling the current online transaction on the lending node to other online node (such as online nodes 211a, 211b, 211c, 211d in FIGS. 2A/2B) in the online node cluster; and after the simulated scheduling succeeds, performing actual scheduling on the current online transaction on the lending node based on the simulated scheduling to actually schedule the current online transaction on the lending node (such as the online nodes 211e and 211f in FIGS. 2A/2B) to the other online node (such as online nodes 211a, 211b, 211c, 211d in FIGS. 2A/2B) in the online node cluster.

In some embodiments, the system for resource scheduling according to the embodiments of the present disclosure further comprises:

an offline transaction controller (such as the offline transaction controller 240 in FIGS. 2A/2B) configured for:

receiving a second instruction from the apparatus for resource scheduling (such as the hybrid-deployment controller 250 in FIG. 2A/FIG. 2B), the second instruction instructing the offline transaction controller to remove a current offline transaction on the lending node;

in response to the second instruction, sending a transaction removal instruction to the lending node to remove the current offline service on the lending node (such as the online nodes 211e, 211f in FIGS. 2A/2B); and/or, in response to the second instruction, setting a compulsory removal time, and when the compulsory removal time expires, compulsorily removing the current offline transaction that has not been removed on the lending node (such as the online nodes 211e, 211f in FIGS. 2A/2B).

Based on the same inventive concept, corresponding to the method of any of the embodiments mentioned above, the present disclosure further provides an electronic device, comprising a memory, a processor, and a computer program stored in the memory and executable on the processor, the program, when executed by the processor, implementing the method for resource scheduling described in any of the above embodiments.

Figure 6:
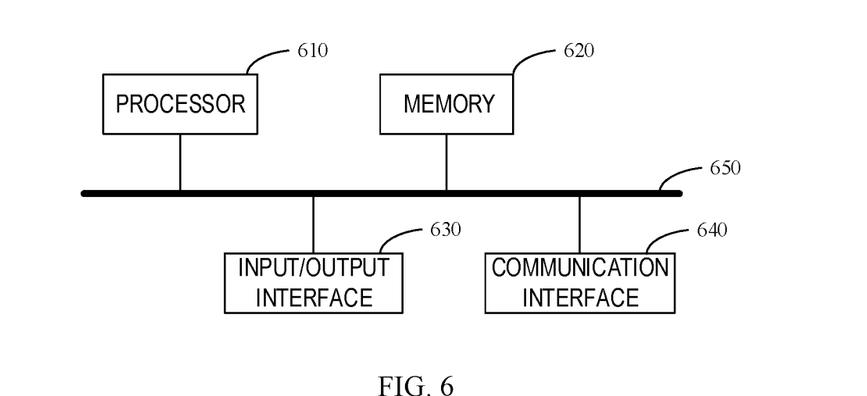
FIG. 6 is a schematic diagram of the hardware structure of an example electronic device in the embodiments of the present disclosure.

FIG. 6 shows a schematic diagram of the hardware structure of an example electronic device provided by the embodiments of the present disclosure. The device may comprise: a processor 610, a memory 620, an input/output interface 630, a communication interface 640, and a bus 650. The processor 610, the memory 620, the input/output interface 630 and the communication interface 640 implement communication connections between each other within the device through the bus 650.

The processor 610 can be implemented using a general CPU (Central Processing Unit), a microprocessor, an application specific integrated circuit (ASIC), or one or more integrated circuits, and is used to execute a related program to implement the technical solutions provided by the embodiments of this specification.

The memory 620 can be implemented in the form of ROM (Read Only Memory), RAM (Random Access Memory), static storage device, dynamic storage device, etc. The memory 620 can store operating systems and other application programs. When the technical solutions provided by the embodiments in this specification are implemented through software or firmware, the relevant program codes are stored in the memory 620 and called and executed by the processor 610.

The input/output interface 630 is used to connect a input/output module to realize information input and output. The input/output/module can be configured in the device as a component (not shown in the figure), or can be externally connected to the device to provide corresponding functions. Input devices can include keyboards, mice, touch screens, microphones, various sensors, etc., and output devices can include displays, speakers, vibrators, indicator lights, etc.

The communication interface 640 is used to connect a communication module (not shown in the figure) to realize communication interaction between this device and other devices. The communication module can communicate in a wired way (such as USB, network cable, etc.) or a wireless way (such as mobile network, WIFI, Bluetooth, etc.).

The bus 650 includes a path that transmits information between various components of the device (e.g., the processor 610, memory 620, input/output interface 630, and communication interface 640).

It should be noted that although the above device only shows the processor 610, the memory 620, the input/output interface 630, the communication interface 640 and the bus 650, the device may further include other components necessary for normal operation during specific implementation. In addition, those skilled in the art can understand that the above device may only include the components necessary to implement the solutions of the embodiments in this specification, without including all the components shown in the drawings.

The electronic device of the above embodiments is used to implement the corresponding method for resource scheduling in any of the foregoing embodiments, with the beneficial effects of the corresponding method embodiments, which will not be repeated here.

Based on the same concept, the embodiments of the present application further provide a non-transitory computer-readable storage medium, storing computer instructions which are used for causing the computer to perform the method for resource scheduling described in any of the above embodiments.

The above non-transitory computer-readable storage medium can be any available medium or data storage device accessible to a computer, including but not limited to magnetic memory (such as floppy disks, hard disks, tapes, magneto-optical disks (MO), etc.), optical memory (such as CD, DVD, BD, HVD, etc.), and semiconductor memory (such as ROM, EPROM, EEPROM, non-volatile memory (NAND FLASH), solid state drive (SSD)), etc.

The computer instructions stored in the storage medium of the above embodiments are used to cause the computer to perform the corresponding method for resource scheduling in any of the above embodiments, with the beneficial effects of the corresponding method embodiments, which will not be repeated here.

Based on the same inventive concept, corresponding to the method for resource scheduling of any of the embodiments mentioned above, the present disclosure further provides a computer program product, which includes a computer program. In some embodiments, the computer program is executable by one or more processors such that the processors perform the method for resource scheduling. Corresponding to the execution body corresponding to each step in each embodiment of the method for resource scheduling of the present disclosure, the processor that executes the corresponding step may belong to the corresponding execution body.

The computer program product of the above embodiments is used to cause the processor to perform the method for resource scheduling described in any of the above embodiments, with the beneficial effects of the corresponding method embodiments, which will not be repeated here.

Those of ordinary skill in the art should understand that the above discussion of any embodiments is only illustrative and is not intended to imply that the scope of the present disclosure (including claims) is limited to these examples; under the spirit of the present disclosure, the above embodiments or technical features in different embodiments may further be combined, the steps may be implemented in any order, and there further exist many other variations of different aspects of the embodiments as described above, which are not provided in detail for the sake of brevity.

Additionally, to simplify illustration and discussion and not to obscure the embodiments of the present disclosure, well-known power/ground connections to integrated circuit (IC) chips and other components may or may not be shown in the drawings provided. Furthermore, apparatuses may be shown in block diagram form in order to avoid obscuring the disclosed embodiments, and this also takes into account the fact that the details regarding the implementation of these block diagram apparatuses are highly dependent on the platform on which the disclosed embodiments are to be implemented (i.e., these details should fall within the understanding of those skilled in the art). Where specific details (e.g., circuits) have been set forth to describe example embodiments of the present disclosure, it will be apparent to one skilled in the art that the embodiments of the present disclosure may be implemented without or with variations in these specific details. Accordingly, these descriptions should be considered illustrative rather than restrictive.

Although the present disclosure has been described in conjunction with specific embodiments thereof, many substitutions, modifications and variations to these embodiments will be apparent to those of ordinary skill in the art from the foregoing description. For example, other memory architectures (e.g., dynamic RAM (DRAM)) can use the embodiments discussed.

The embodiments of the present disclosure are intended to cover all such substitutions, modifications and variations that fall within the broad scope of the appended claims. Therefore, any omissions, modifications, equivalent substitutions, improvements and the like made within the spirit and principles of the embodiments of the present disclosure shall be included in the protection scope of the present disclosure.

What is claimed is:

1. A method of resource scheduling, comprising:
monitoring a status of online nodes in an online node cluster, the online node cluster comprising a plurality of online nodes and supporting scheduling by an online transaction controller for processing online transactions;
in response to the status of the online nodes meeting a hybrid-deployment triggering condition in a hybrid-deployment policy, determining a lending node from the online node cluster, the lending node used to be provided to an offline transaction controller for scheduling to process offline transactions; the hybrid-deployment triggering condition being used to indicate a node status condition that triggers hybrid scheduling of online nodes and offline nodes;
sending a first instruction to the online transaction controller, the first instruction indicating the online transaction controller to schedule a current online transaction on the lending node to another online node than the lending node in the online node cluster for processing; and
in response to the current online transaction on the lending node being scheduled to the other online node, changing a first status tag value of the lending node to a second status tag value, the first status tag value indicating that the online node is used to be scheduled by the online transaction controller to process online transactions, the second status tag value indicating that the lending node is used to be scheduled by an offline transaction controller to process offline transactions.

2. The method according to claim 1, wherein determining the lending node from the online node cluster comprises:
filtering out the lending node from the online node cluster according to filtering rules in the hybrid-deployment policy, the filtering rules comprising at least one of a first predetermined rule, a second predetermined rule and a third predetermined rule;
wherein the first predetermined rule comprises:
determining whether a total resource amount of a first online node is less than that of a second online node;
in response to the total resource amount of the first online node being less than that of the second online node, determining that the first online node is prioritized in lending over the second online node;
the second predetermined rule comprises:
determining whether a total resource amount of a third online node is less than that of a fourth online node;
in response to the total resource amount of the third online node being less than that of the fourth online node, determining that the third online node is prioritized in lending over the fourth online node;
the third predetermined rule comprises:
determining whether the minimum allowed amount of disruptions of a fifth online node is greater than that of a sixth online node;
in response to the minimum allowed amount of disruptions of the fifth online node being greater than that of the sixth online node, determining that the fifth online node is prioritized in lending over the sixth online node.

3. The method according to claim 2, wherein filtering out the lending node from the online node cluster according to the filtering rules comprises:
determining the order of any two of the online nodes by selecting the first predetermined rule, the second predetermined rule or the third predetermined rule based on a priority order corresponding to the first predetermined rule, the second predetermined rule or the third predetermined rule;
obtaining a ranking of all the online nodes based on the order of any two nodes; and
selecting the top m online nodes in the ranking as the lending nodes, m being a positive integer.

4. The method according to claim 1, further comprising:
while the current online transaction on the lending node is being scheduled to other online node than the lending node in the online node cluster for processing, changing the first status tag value of the lending node to a third status tag value, the third status tag value indicating that the lending node is in removal of the current online transaction and is not invoked by the online transaction controller or the offline transaction controller; and
after the current online transaction on the lending node is scheduled to the other online node for processing, changing the third status tag value of the lending node to the second status tag value.

5. The method according to claim 1, further comprising:
in response to a status of the online nodes meeting a hybrid-deployment terminating condition in the hybrid scheduling policy, changing the second status label value of the lending node to the first status tag value;
wherein the hybrid-deployment terminating condition is used to indicate a node status condition for terminating the hybrid scheduling of online nodes and offline nodes.

6. The method according to claim 5, wherein changing the second status tag value of the lending node to the first status tag value comprises:
sending a second instruction to the offline transaction controller, the second instruction indicating the offline transaction controller to remove the current offline transaction on the lending node; and changing the second status tag value of the lending node to a fourth status tag value, the fourth status tag value indicating that the lending node is in removal of the current offline transaction; and
in response to the removal of the current offline service being completed, changing the fourth status tag value of the lending node to the first status tag value.

7. The method according to claim 1, wherein the hybrid-deployment policy comprises at least one of:
source information of the online nodes,
target information of the offline nodes,
a predetermined time period of hybrid scheduling, or
a predetermined number of lending nodes.

8. The method according to claim 7, wherein the hybrid-deployment triggering condition comprise at least one of:
during the predetermined time period, or
within the predetermined resource utilization rate range.

9. A system for resource scheduling, comprising:
online nodes configured to process online transactions; the online node comprising an online node agent and an offline node agent, wherein the offline node agent is deployed in the online node based on a copy of the online node and communicates with the online node agent to obtain resource information of the online node;
offline nodes configured to process offline transactions; and
an apparatus for resource scheduling configured to perform resource scheduling on the online node, so that at least a portion of the online nodes are used to process offline transactions, wherein the apparatus for resource scheduling comprises one or more processors, a memory and one or more programs, wherein the one or more programs are stored in the memory and executed by the one or more programs, the program comprising instructions for:
monitoring a status of online nodes in an online node cluster, the online node cluster comprising a plurality of online nodes and supporting scheduling by an online transaction controller for processing online transactions;
in response to the status of the online nodes meeting a hybrid-deployment triggering condition in a hybrid-deployment policy, determining a lending node from the online node cluster, the lending node used to be provided to an offline transaction controller for scheduling to process offline transactions; the hybrid-deployment triggering condition being used to indicate a node status condition that triggers hybrid scheduling of online nodes and offline nodes;
sending a first instruction to the online transaction controller, the first instruction indicating the online transaction controller to schedule a current online transaction on the lending node to another online node than the lending node in the online node cluster for processing; and
in response to the current online transaction on the lending node being scheduled to the other online node, changing a first status tag value of the lending node to a second status tag value, the first status tag value indicating that the online node is used to be scheduled by the online transaction controller to process online transactions, the second status tag value indicating that the lending node is used to be scheduled by an offline transaction controller to process offline transactions.

10. The system according to claim 9, further comprising:
a controller circuit for online transaction and configured to:
receive the first instruction from the apparatus for resource scheduling;
in response to the first instruction, perform simulated scheduling on a current online transaction on the lending node to simulate scheduling the current online transaction on the lending node to another online node in the online node cluster; and
after the simulated scheduling succeeds, perform actual scheduling on the current online transaction on the lending node based on the simulated scheduling to actually schedule the current online transaction on the lending node to the other online node in the online node cluster.

11. The system according to claim 9, further comprising:
a controller circuit for offline transaction and configured to:
receive a second instruction from the apparatus for resource scheduling, the second instruction indicating the offline transaction controller to remove a current offline transaction on the lending node; and
in response to the second instruction, send a transaction removal instruction to the lending node to remove the current offline service on the lending node; and/or, in response to the second instruction, set a compulsory removal time, and in response to that the compulsory removal time expires, compulsorily removing the current offline transaction that has not been removed on the lending node.

12. The system according to claim 9, wherein the hybrid-deployment policy comprises at least one of:
source information of the online nodes,
target information of the offline nodes,
a predetermined time period of hybrid scheduling, or
a predetermined number of lending nodes.

13. The system according to claim 12, wherein the hybrid-deployment triggering condition comprise at least one of:
during the predetermined time period, or
within the predetermined resource utilization rate range.

14. A non-transitory computer-readable storage medium, containing a computer program which, when executed by one or more processors, causes the processor to perform a method of resource scheduling, comprising:
monitoring a status of online nodes in an online node cluster, the online node cluster comprising a plurality of online nodes and supporting scheduling by an online transaction controller for processing online transactions;
in response to the status of the online nodes meeting a hybrid-deployment triggering condition in a hybrid-deployment policy, determining a lending node from the online node cluster, the lending node used to be provided to an offline transaction controller for scheduling to process offline transactions; the hybrid-deployment triggering condition being used to indicate a node status condition that triggers hybrid scheduling of online nodes and offline nodes;
sending a first instruction to the online transaction controller, the first instruction indicating the online transaction controller to schedule a current online transaction on the lending node to another online node than the lending node in the online node cluster for processing; and
in response to the current online transaction on the lending node being scheduled to the other online node, changing a first status tag value of the lending node to a second status tag value, the first status tag value indicating that the online node is used to be scheduled by the online transaction controller to process online transactions, the second status tag value indicating that the lending node is used to be scheduled by an offline transaction controller to process offline transactions.

15. The medium according to claim 14, wherein determining the lending node from the online node cluster comprises:
filtering out the lending node from the online node cluster according to filtering rules in the hybrid-deployment policy, the filtering rules comprising at least one of a first predetermined rule, a second predetermined rule and a third predetermined rule;

wherein the first predetermined rule comprises:
determining whether a total resource amount of a first online node is less than that of a second online node;
in response to the total resource amount of the first online node being less than that of the second online node, determining that the first online node is prioritized in lending over the second online node;
the second predetermined rule comprises:
determining whether a total resource amount of a third online node is less than that of a fourth online node;
in response to the total resource amount of the third online node being less than that of the fourth online node, determining that the third online node is prioritized in lending over the fourth online node;
the third predetermined rule comprises:
determining whether the minimum allowed amount of disruptions of a fifth online node is greater than that of a sixth online node;
in response to the minimum allowed amount of disruptions of the fifth online node being greater than that of the sixth online node, determining that the fifth online node is prioritized in lending over the sixth online node.

16. The medium according to claim 15, wherein filtering out the lending node from the online node cluster according to the filtering rules comprises:
determining the order of any two of the online nodes by selecting the first predetermined rule, the second predetermined rule or the third predetermined rule based on a priority order corresponding to the first predetermined rule, the second predetermined rule or the third predetermined rule;
obtaining a ranking of all the online nodes based on the order of any two nodes; and
selecting the top m online nodes in the ranking as the lending nodes, m being a positive integer.

17. The medium according to claim 14, further comprising:
while the current online transaction on the lending node is being scheduled to other online node than the lending node in the online node cluster for processing, changing the first status tag value of the lending node to a third status tag value, the third status tag value indicating that the lending node is in removal of the current online transaction and is not invoked by the online transaction controller or the offline transaction controller; and
after the current online transaction on the lending node is scheduled to the other online node for processing, changing the third status tag value of the lending node to the second status tag value.

18. The medium according to claim 14, further comprising:
in response to a status of the online nodes meeting a hybrid-deployment terminating condition in the hybrid scheduling policy, changing the second status label value of the lending node to the first status tag value;
wherein the hybrid-deployment terminating condition is used to indicate a node status condition for terminating the hybrid scheduling of online nodes and offline nodes.

19. The medium according to claim 18, wherein changing the second status tag value of the lending node to the first status tag value comprises:
sending a second instruction to the offline transaction controller, the second instruction indicating the offline transaction controller to remove the current offline transaction on the lending node; and changing the second status tag value of the lending node to a fourth status tag value, the fourth status tag value indicating that the lending node is in removal of the current offline transaction; and
in response to the removal of the current offline service being completed, changing the fourth status tag value of the lending node to the first status tag value.

20. The medium according to claim 14, wherein the hybrid-deployment policy comprises at least one of:
source information of the online nodes,
target information of the offline nodes,
a predetermined time period of hybrid scheduling, or
a predetermined number of lending nodes.

* * * * *